1,745,361

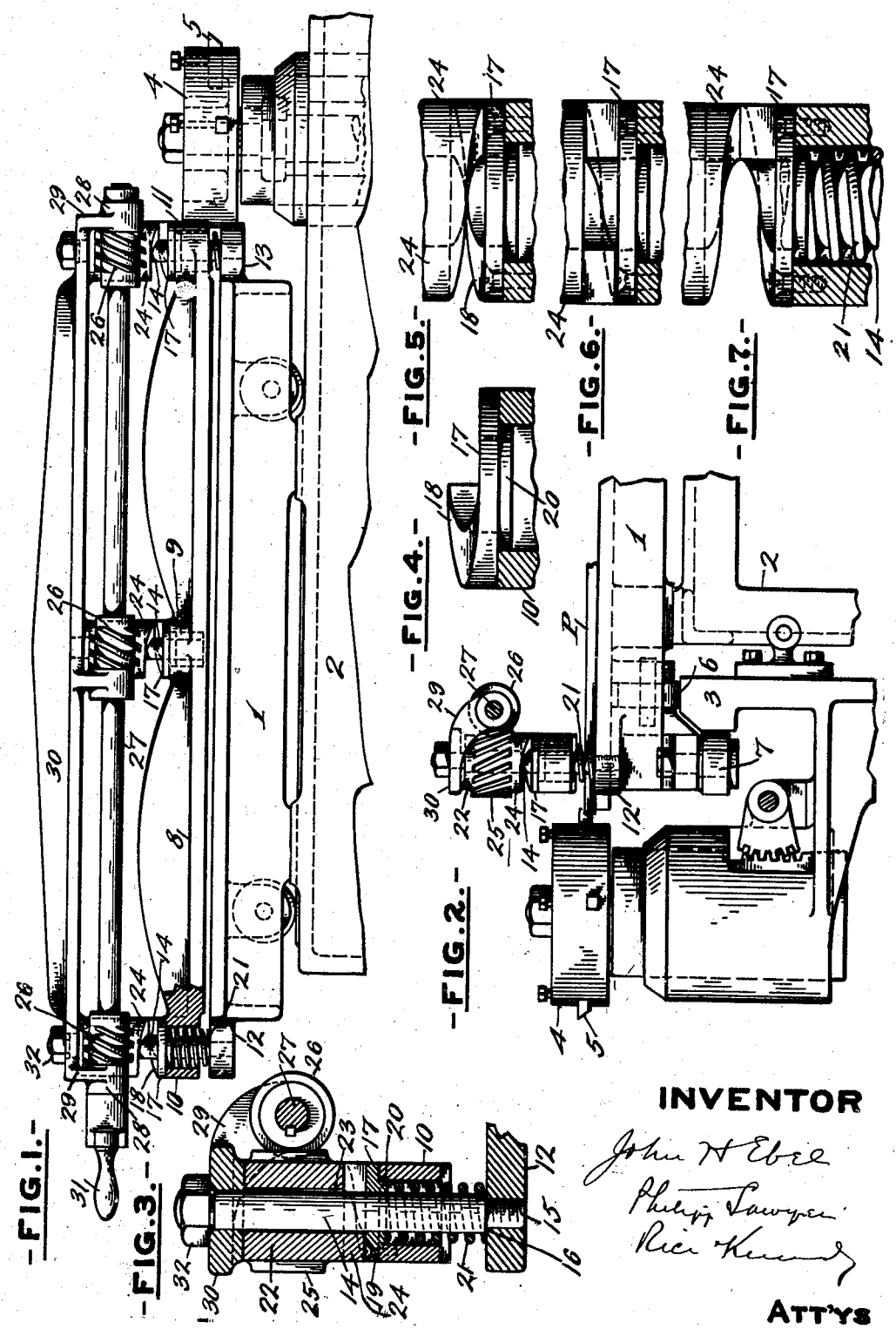
Feb. 4, 1930. J. H. EBEL 1,745,361
PLATE CLAMP FOR TRIMMING MACHINES
Filed Dec. 7, 1923
INVENTOR
John H Ebel
ATT'YS Patented Feb. 4, 1930

UNITED STATES PATENT OFFICE

JOHN H. EBEL, OF BROOKLYN, NEW YORK, ASSIGNOR, BY MESNE ASSIGNMENTS, TO R. HOE AND CO., INC., OF NEW YORK, N. Y., A CORPORATION OF NEW YORK

PLATE CLAMP FOR TRIMMING MACHINES

Application filed December 7, 1923. Serial No. 679,112.

This invention relates to certain improvements in clamping mechanisms for plate trimming machines.

In these plate trimming machines there is usually provided a work support on which the plate to be trimmed is clamped into position, a trimming mechanism, such as a rotary cutter, the work support and the cutter having a movement relative to each other. Mechanism is also provided for moving the clamp to and locking it in clamping position, together with means for releasing the clamp. These clamping and operating mechanisms, however, have to be adjusted if it is desired to operate on plates of different thicknesses, and to get the adjustment the same for both ends of the clamp takes time, and is unsatisfactory for this and other reasons.

It is the especial object of the present invention to provide a clamping mechanism for this class of machines in which the clamp may be moved and locked in clamping position with plates which vary considerably in thickness without any adjustment of the mechanism being necessary, and by which the plate will be held parallel on the support so as to be properly presented to the trimming mechanism.

It is a further object of the present invention to produce such a mechanism of simple form and one in which means are provided for assisting the quick release and quick positioning of the clamp so that time is saved in the plate positioning and removing operations.

With these and other objects not specifically referred to, the invention consists in certain novel parts, arrangements, and combinations, which will be fully described in connection with the accompanying drawings, and the novel features pointed out in the claims hereunto annexed, the accompanying drawings showing a preferred form of the invention.

In these drawings—

Figure 1 is a side view, partly broken away and partly in section, of so much of a plate trimming machine with the improved clamps embodied therein, as is necessary for an understanding of the invention.

Figure 2 is an end view of the construction shown in Fig. 1;

Figure 3 is a detail sectional view on an enlarged scale of one of the clamp adjusting and locking devices;

Figure 4 is a view on a still further enlarged scale of one of the cam surfaces or wedges for operating the clamp;

Figures 5, 6 and 7 are detailed views on the scale of Fig. 4 showing the positions of the co-operating cam surfaces during the clamping operation; Fig. 5 showing the relation of the cams when the clamp is released; Fig. 6 the position of the cams or wedges at the start of the downward or clamping movement of the clamp; and Fig. 7 when the clamp is in clamping relation with the plate on the support.

Referring now to these drawings, the invention includes a work support 1, mounted on framing 2, 3 of any suitable character. Closely adjacent to this work support is a cutter head 4 carrying the cutting or trimming knives 5. In the particular construction illustrated, the plate support is movable relatively to the cutter head, and this movement is effected by pushing the support back and forth along the frames. To facilitate this movement the plate support is provided with antifriction rolls 6 and 7. Co-operating with the plate support there is provided a clamp in the form of a frame 8, this frame being provided with a central hub 9 and end hubs 10, 11, the end hubs being arranged at opposite ends of the clamp, so that the clamping pressure may be the same at each end, as will be described. These hubs 10, 11 are, as shown, extended over the work support and above ledges 12, 13 formed on the work support at each end. In these ledges are secured supporting bolts 14, these bolts, as shown in Fig. 3, being provided with a reduced end 15 and a shoulder 16, the shoulder bearing against the upper surface of the ledge and forming a seat for the bolt. The shank of the bolt 14 passes through the hub and through a cam or wedge member 17 having a cam face 18, this wedge member being secured to the hub in any suitable manner, as by screws 19. This wedge member is or may be provided with a boss 20 forming a seat for one end of a spring 21, the other end of this spring taking against the upper face of the ledge 12, before referred to, it being understood that the construction at the other end of the machine shown in Fig. 1 is the same. The clamp 8 is thus spring seated on the work support at a plurality of points and carries operating members having inclined or cam surfaces, three of such members being shown.

Co-operating with the cam adjusting members on the clamp frame are actuating members 22 in the form of blocks apertured as at 23 to permit the passage therethrough of the bolt 14. These actuating members are formed at their lower ends with cam surfaces 24, these cam surfaces 24 being complementary to the cam surfaces 17, before referred to. Means are provided for rotating the actuator blocks to move the cam surfaces relatively to the cam surfaces on the clamp, this movement resulting when the blocks are rotated in one direction in forcing the clamp into clamping relation with a plate P on the support and on the reverse movement freeing the cams on the clamp so that the springs act to move the clamp out of clamping relation with the plate.

While these means may be somewhat varied, in the best form of the invention they will be such that the actuators are simultaneously operated. In the particular construction illustrated, the actuator blocks 22 are exteriorly in the form of a worm gear illustrated at 25, and these gears are rotated by means of worm gears 26 carried on a cross shaft 27 supported in bearings 28 on arms 29 extending from a frame work 30 supported by the bolts 14, before referred to, this shaft 27 being provided with an operating handle 31.

It will be observed that by turning this handle 31 the cam or wedge surface 24 will ride up the cam or wedge surface 17 and act to force the clamp frame downwardly against the springs, the thrust of this action being taken up by the nut 32 on the end of the bolt 14 above referred to. The parts are securely held in adjusted position by the engagement of the worm threads on the worm gears 26 and the actuator blocks 22.

With this construction the clamps can be moved to clamping position and held in such position irrespective of the thickness of the plates on the support within the limits of the operating surface or of the actuator blocks and the cam surfaces on the clamp. Furthermore, the clamp is quickly and easily adjusted in clamping position and quickly and easily freed from a plate on the work support so that time is saved in the plate positioning operations.

While the invention has been shown and described in its preferred form, it will be understood that various changes may be made in the specific construction and arrangements of parts and in the specific form of the clamps without departing from the invention.

What I claim is:

1. A plate trimming machine for trimming the edges of printing plates having in combination a plate support, a trimming mechanism arranged at one side of the support, a vertically movable clamp frame acting to clamp a plate on the support with the edge to be trimmed exposed to the trimming mechanism, clamp operating members at each end of the clamp frame having cam surfaces, and manually operated spring controlled means for simultaneously operating the members to clamp the plate on the support at each end.

2. A plate trimming machine for trimming the edges of printing plates having in combination a plate support, a trimming mechanism arranged at one side of the support, a vertically movable clamp frame acting to clamp the plate on the support with the edge to be trimmed exposed to the trimming mechanism, spring controlled clamp operating members at each end of the clamp frame having cam surfaces, actuators having cam surfaces cooperating therewith, and means for simultaneously operating the actuators to clamp the plate on the support at each end.

3. In a clamping mechanism for plate trimming machines, the combination of a vertically movable clamp frame, hubs thereon, springs supporting the hubs, cam surfaces on the hubs, supporting members passing through the hubs, actuator blocks having externally geared surfaces and cam surfaces, a shaft, and gears on the shaft meshing with the gears on the blocks.

4. A plate trimming machine for trimming the edges of printing plates having in combination a plate support, a trimming mechanism arranged at one side of the support, a vertically movable clamp frame acting to clamp a plate on the support with the edge to be trimmed exposed to the trimming mechanism, spring controlled clamp operating members at each end of the clamp frame having cam surfaces, cooperating actuators secured to the clamp and having cam surfaces, a shaft extending longitudinally of the clamp, and gear connections from the shaft to the actuators whereby the clamp is operated to simultaneously clamp the plate on the support at each end.

5. In a clamping mechanism for plate trimming machines, the combination of a vertically movable clamp frame, spring controlled hubs supported by the frame and having cam surfaces, actuator blocks having an external gear and cam surfaces, a support for the blocks, and means for rotating the blocks.

6. In a clamping mechanism for plate trimming machines, the combination of a vertically movable clamp frame, spring controlled hubs supported by the frame and having cam surfaces, actuator blocks having an external gear and a cam surface, a shaft, and gears on the shaft meshing with the gears on the blocks.

In testimony whereof, I have hereunto set my hand.

JOHN H. EBEL.